Patented Mar. 7, 1933

1,900,871

UNITED STATES PATENT OFFICE

CYRIL J. STAUD AND CHARLES S. WEBBER, OF ROCHESTER, NEW YORK, ASSIGNORS TO EASTMAN KODAK COMPANY, OF ROCHESTER, NEW YORK, A CORPORATION OF NEW YORK

DOUBLE ALPHA KETONIC ACID CELLULOSE ESTERS AND PROCESS OF MAKING THE SAME

No Drawing. Application filed February 25, 1929. Serial No. 342,668.

This invention relates to double alpha ketonic acid cellulose esters, including an acyl radical, and the process of making them.

Cellulose acetate is a well known ester. The exact constitution of this ester is not known. It has been definitely shown, however, that cellulose has three hydroxyl groups per $C_6H_{10}O_5$, all of which are esterifiable with acetic anhydride in the presence of a catalyst. When fully acetylated a cellulose triacetate results which is insoluble in most of the usual solvents for cellulose ester. The only practicable solvent is chloroform, which is too expensive for most commercial purposes. To make the ester available, it is customary to subject it to a partial hydrolysis to remove one or more of the acetyl radicals, the ester being then soluble in acetone—a relatively cheap commercial solvent. Triacetyl cellulose contains 44.8% of acetyl. Depending upon the extent of hydrolysis, the acetyl content of the ester may be varied from the triacetate to the regenerated cellulose which contains 0% acetyl. While the hydrolyzed ester, usually employed, contains approximately 38% acetyl, is soluble in acetone and is thus available for some purposes, it is not soluble in many solvents and in particular is insoluble in water. The esters containing lower percentages of acetyl have little commercial value at the present time. Consequently, the uses of the ester are comparatively limited.

The object of the present invention is to provide hitherto unknown mixed cellulose esters containing an acyl radical and ketonic acid radical which compounds exhibit new and unusual solubility relations.

We have discovered double esters of cellulose including an aliphatic or aromatic acyl radical and a radical of another acid of the group including the alpha and gamma ketonic acids and that such double esters have new and desirable properties which adapt them for commercial applications. These double esters can be prepared by the substitution of the radicals of the acids mentioned, for one or more of the acyl radicals in cellulose ester containing varying proportions of the acyl radical. The substitution may be effected, for example, by digesting a solution of cellulose acetate in the acid in question for a sufficient period and under conditions which avoid degradation of the cellulose nucleus. The double ester thus prepared may be separated, as a solid, by precipitation. It may be freed from contaminating materials and prepared thus in a substantially pure condition.

The acids which are adapted for use in preparing double esters are particularly pyruvic, (alpha-keto-propionic acid), alpha-keto-butyric, alpha-keto-valeric, and alpha-keto-caproic acid. Levulinic acid, which is a gamma-keto-valeric acid, has likewise been found suitable for the preparation of the double esters. The radicals of these acids, for example, may be substituted in part for the acetyl radical in triacetyl cellulose or an acetyl cellulose which has been partially hydrolyzed, and the substitution results in a double ester having generally improved characteristics, particularly with respect to solubility. The total esterified hydroxyl in the cellulose may remain the same or be diminished according to the acid used and the amount of water present and the acetyl content of the starting material. The special characteristics of each of the double esters will vary, depending upon the particular radical which is substituted therein, and the amount of the substitution effected. The double esters of all of the acids mentioned are, however, generally similar, as regards their successive solubility as more of the alpha-ketonic radical is introduced and acetyl is removed by displacement or by hydrolysis.

The procedure whereby the substitution is effected will also vary somewhat, depending upon the acid radical to be substituted. It is essential, for example, that the cellulose ester be soluble in the acid employed, and the solubility differs.

The temperature required is not definitely fixed,—that is to say, the substitution can be effected at a relatively low temperature with a sufficient time factor. If the temperature is higher reaction is more rapid. Generally speaking, a temperature of about 100° C., is desirable, since rapid conversion is thereby accomplished. The highly concentrated solutions of acid in water would boil well above 100° C., since the boiling point of solutions of slightly ionized solutes is raised 1.52° per molecular concentration. A higher temperature may be employed with a corresponding higher pressure, that is to say, if the reaction is conducted in a pressure-resisting vessel. There is apparently no advantage to operation under pressure, and a temperature of about 100° C., is, therefore, desirable.

The time required to complete the reaction will vary widely, depending upon the particular acid radical which is substituted in the cellulose ester and the extent to which the substitution is effected. The water content will also introduce considerable variation in the time required to obtain a product of a desired solubility. The reaction may be satisfactorily completed in 5 or 6 hours or less, or it may require the relatively extended time,—that is, 48 hours or more. It is to be understood that esters having varying proportions of the substituted acid radical may be prepared and the products, while differing somewhat in special characteristics are, nevertheless, similar. Time and other conditions will be modified, therefore, in view of the results which are desired. The constitution of the products is relatively complicated and no attempt will be made, therefore, to indicate the exact arrangement of the groups in the molecule. The products can, however, be analyzed, and analysis shows the presence of varying proportions of the acyl and substituted acid radicals.

The reaction may be conducted in an open flask or vessel. It is necessary that the heating be uniform to avoid charring of the material and it is desirable, therefore, to employ a steam or oil bath, which insures the uniform distribution of the heat and avoids overheating of any part of the mixture. The flask or vessel is provided preferably with an extension serving as a reflux condenser, so that any water separated from the mixture as steam will be condensed and returned thereto. Evaporation of the contents of the flask or vessel is thus avoided.

With this general understanding of the object and nature of the invention, we shall present several specific examples as follows:

*Example I.*—Ten grams of cellulose triacetate are dried at 105° C. They are dissolved in 50 grams of C. P. pyruvic acid, $CH_3CO.COOH$. Pyruvic acid is a good solvent for cellulose triacetate. The flask containing the solution of cellulose triacetate in pyruvic acid is equipped with a reflux condenser and immersed in an oil bath, heated at 100° C.

If the product be precipitated at the close of 2.75 hours heating, using ether as the precipitant, and washed with ether by decantation a material is obtained which is soluble in acetone, fairly soluble in 75% aqueous ethyl alcohol and insoluble in water giving a gummy precipitate.

If the product be precipitated after 16.75 hours in ether and washed in ether by decantation, a material is obtained which is soluble in 50% aqueous alcohol (ethyl) at 20–30° C., insoluble in 95% ethyl alcohol, and also in water.

*Example II.*—Ten grams of cellulose acetate which has been hydrolyzed from 44.6% acetyl to 33% acetyl precipitated, washed, and dried at 105° C. are dissolved in 50 grams of C. P. pyruvic acid. Pyruvic acid has been found to be a good solvent for cellulose acetate containing 33% acetyl and possessing the characteristic of being soluble in hot 75% aqueous ethyl alcohol.

The solution of cellulose acetate in pyruvic acid is contained in a balloon flask, equipped with a reflux condenser and immersed in a bath at 100° C. After heating for 3½ hours, during which there appears to be considerable evolution of gas, the product is precipitated in acetone or ether and washed by decantation with fresh portions of the precipitant until free from acid. After drying the product is slightly soluble in water, and 95% ethyl alcohol at 20–30° C., but very soluble in 50–75% aqueous ethyl alcohol and in chloroform-alcohol (85 parts chloroform 15 parts alcohol).

*Example III.*—Ten grams of acetone soluble cellulose acetate containing 37.6% acetyl are dried at 105° C. and dissolved in 50 grams of C. P. pyruvic acid in a flask. The flask is equipped with a reflux condenser and heated in a bath at 100° C. After 7 hours' heating the product is precipitated in ether and washed by decantation with ether.

The material obtained as described above is soluble in acetone and in chloroform-alcohol (85% of the former and 15% of the ethyl alcohol, 95% by volume). It is insoluble in 75% ethyl alcohol, aqueous, and in 50% aqueous ethanol. It gelatinizes in water and in 95% ethyl alcohol.

*Example IV.*—Ten grams of cellulose acetate, soluble in hot 75% ethanol and containing 33% acetyl, are dried at 100° C. They are then dissolved in 50 cc. of technical pyruvic acid in a 200 cc. flask equipped with a reflux condenser. The flask is heated at 100° C., for one hour during which time there is a considerable quantity of gas evolved. The product is precipitated in acetone and washed by decantation with the precipitant until free from acid as indicated by bromthymol blue.

The resulting product is soluble in cold water and also in 50–75% ethanol as well as chloroform alcohol.

As the product is precipitated after three hours heating at 100° C., with techincal pyruvic acid it will be soluble in 50% aqueous ethanol and also in water and insoluble in 95% ethanol, 75% ethanol, acetone, chloroform, and chloroform-alcohol.

*Example V.*—Ten grams of cellulose acetate (34% acetyl) are dissolved in 50 grams of levulinic acid and heated by steam (100° C.) in a flask carrying a reflux condenser. After heating for 52 hours a product was obtained, a cellulose-aceto-levulinate that was soluble in 50% aqueous ethanol solution.

It will be understood that the substitution of acid radicals of the group mentioned for acetyl in the cellulose acetate approaches an equilibrium beyond which the reaction will not proceed and is never complete, so that a double ester is always obtained. The amount of substitution effected depends upon the conditions including proportions and particularly the time during which the reaction proceeds. The conditions are easily regulated so that it is possible to produce esters with varying proportions of substituted acid radicals. The solubility of the ester in various solvents differs with the character and proportion of the substituted acid radical. When the reaction proceeds for a limited time the product is soluble in acetone. This solubility is realized only when cellulose triacetate is used as a starting material or if it has been partially saponified and an acetyl content of greater than 41% is present. If acetone soluble cellulose acetate be employed containing from 37-42% acetyl, the product very soon becomes insoluble in acetone, and at no subsequent point in the procedure does it again become soluble in this reagent. Also, when cellulose acetate which is soluble in hot 75% aqueous ethanol and contains 30-36% acetyl is used, no products are obtained which are soluble in acetone. Further treatment yields products which are soluble in 75% ethyl alcohol and in 50% ethyl alcohol. When the reaction has progressed to a sufficient extent, the product is soluble in water. It is possible, therefore, by suitably controlling the operation, to produce esters which are soluble in certain solvents and insoluble in others. Thus the ester may be soluble in acetone but insoluble in ethyl alcohol and water. It may be soluble in 75% ethyl alcohol but insoluble in 50% ethyl alcohol and water, or it may be soluble in all of the solvents mentioned, except acetone. The purpose for which the ester is to be used will govern the conditions of the reactions so that a product having characteristics notable for that purpose may be obtained.

Various changes may be made, therefore, in the procedure and the materials employed therein for the purpose of the invention, the examples herein presented being merely illustrative of the class of esters and the methods of preparing them.

Having thus described our invention, what we claim as new and desire to secure by Letters Patent is:

1. A mixed cellulose ester including an acyl radical and a radical of an alpha ketonic acid.
2. A mixed cellulose ester including an acetyl radical and a radical of an alpha ketonic acid.
3. A mixed cellulose acyl ester prepared from a celulose acyl ester having substituted for an acyl radical therein, a radical of an alpha ketonic acid.
4. A mixed cellulose ester containing acetyl groups prepared from a cellulose acetate in which an acetyl radical has been substituted by a radical of an alpha ketonic acid.
5. A mixed cellulose ester comprising a partially hydrolyzed cellulose acetate having substituted for an acetyl radical therein, a radical of an alpha ketonic acid.
6. A water-soluble, mixed cellulose ester including an acetyl radical and a radical of an alpha ketonic acid.
7. A mixed cellulose ester including an acetyl radical and a pyruvic acid radical.
8. A method of preparing mixed cellulose esters which comprises digesting a solution of an acyl ester of cellulose in an alpha ketonic acid.
9. A method of preparing mixed cellulose esters which comprises digesting a solution of cellulose acetate in an alpha ketonic acid.
10. A method of preparing mixed cellulose esters which comprises digesting a solution of cellulose acetate in an alpha ketonic acid at a temperature of approximately 100° C.
11. A method of preparing mixed cellulose esters which comprises digesting a solution of cellulose acetate in an alpha ketonic acid, precipitating the mixed ester and separating and washing the precipitate.
12. A method of preparing mixed cellulose esters which comprises digesting a solution of an acyl ester of cellulose in an alpha ketonic acid, the acid being a solvent for the cellulose acyl ester.
13. A method of preparing mixed cellulose esters which comprises digesting a solution of cellulose acetate in the presence of an alpha ketonic acid, the acid being a solvent for the cellulose acetate.
14. A mixed cellulose ester including an acetyl radical and an alpha-keto-valeric acid radical.

Signed at Rochester, New York, this 20th day of February, 1929.

CYRIL J. STAUD.
CHARLES S. WEBBER.